United States Patent
Bordogna et al.

(10) Patent No.: US 6,560,202 B1
(45) Date of Patent: *May 6, 2003

(54) CONTROL ARCHITECTURE USING A MULTI-LAYER EMBEDDED SIGNAL STATUS PROTOCOL

(75) Inventors: Mark Aldo Bordogna, North Andover, MA (US); Philip Sidney Dietz, East Hampstead, NH (US); Joseph Elide Landry, Atkinson, NH (US); Jeffrey Robert Towne, Litchfield, NH (US); Warren Clifton Trested, Jr., E. Hampstead, NH (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/123,086

(22) Filed: Jul. 27, 1998

(51) Int. Cl.$^7$ .................................................. H04J 1/16
(52) U.S. Cl. ...................... 370/248; 370/236; 370/386
(58) Field of Search ................................ 370/229, 230, 370/249, 392, 401, 396, 466, 222, 474, 244, 242, 248, 386, 236; 714/712; 709/231; 725/36

(56) References Cited

U.S. PATENT DOCUMENTS

| | | | |
|---|---|---|---|
| 4,847,877 A | 7/1989 | Besseyre ..................... | 375/368 |
| 5,008,882 A | 4/1991 | Peterson et al. ............ | 370/406 |
| 5,151,902 A | 9/1992 | Gallert et al. ............... | 714/704 |

(List continued on next page.)

FOREIGN PATENT DOCUMENTS

| | | | |
|---|---|---|---|
| EP | 0 579 040 A2 | 1/1994 | ............ H04Q/3/00 |
| EP | 0 721 275 A2 | 7/1996 | ............ H04M/3/36 |
| EP | 0 824 292 A | 2/1998 | ............ H04L/12/56 |
| EP | 0 840 472 A2 | 5/1998 | ............ H04J/3/14 |
| WO | WO 97 42729 A | 11/1997 | ............ H04L/1/22 |

OTHER PUBLICATIONS

Anderson, J. et al., "Virtual Path Group Protection Switching—A Method for Fast ATM Network Survivability", *Bell Labs Technical Journal*, Spring 1997, vol. 2, No. 2, pp. 213–232.

(List continued on next page.)

*Primary Examiner*—Hassan Kizou
*Assistant Examiner*—John Pezzlo
(74) *Attorney, Agent, or Firm*—Gregory J. Murgia

(57) ABSTRACT

Distributed switch fabrics can support multiple switching functions while meeting established performance requirements by using a control architecture based on multiple layers of signal status carried within signals transported through the distributed switch fabrics. More specifically, a method and apparatus is provided for controlling the selection of signals through distributed switch fabrics by deriving signal status information for the signals at any point along a transmission path and embedding the signal status information in each of the signals using multiple signal status layers. Each of the signals carries its respective signal status information as it propagates along the transmission path, so that the embedded signal status information can be selectively extracted from any of the multiple signal status layers to facilitate a selection decision at any of the distributed switch fabrics. The multiple layers of signal status can be used to provide a cumulative signal status of a particular signal as it propagates along the transmission path or the multiple layers can be used to support various combinations of status control, such as each layer being used to track a different level or type of status for the signal.

24 Claims, 10 Drawing Sheets

U.S. PATENT DOCUMENTS

| | | | | |
|---|---|---|---|---|
| 5,455,832 A | * | 10/1995 | Bowmaster | 714/712 |
| 5,465,256 A | | 11/1995 | Fowler | 370/522 |
| 5,467,347 A | * | 11/1995 | Petersen | 370/230 |
| 5,555,477 A | | 9/1996 | Tomooka et al. | 359/115 |
| 5,608,720 A | * | 3/1997 | Biegel et al. | 370/249 |
| 5,636,203 A | | 6/1997 | Shah | 370/244 |
| 5,721,727 A | | 2/1998 | Ashi et al. | 370/244 |
| 5,729,548 A | * | 3/1998 | Holender | 370/474 |
| 5,838,684 A | | 11/1998 | Wicki et al. | 370/416 |
| 5,892,535 A | * | 4/1999 | Allen et al. | 725/36 |
| 6,058,120 A | * | 5/2000 | Sabzevari | 370/466 |
| 6,081,503 A | * | 6/2000 | Bordogna et al. | 370/222 |
| 6,081,525 A | * | 6/2000 | Christie et al. | 370/392 |
| 6,147,994 A | * | 11/2000 | Duree et al. | 370/392 |

OTHER PUBLICATIONS

Wu, T–H, "Emerging Technologies for Fiber Network Survivability", *IEEE Communications Magazine*, vol. 33, Feb. 1995, No. 2, pp. 58–59, 62–74.

ITU–T Recommendation G.783, "Characteristics of Synchronous Digital Hierarchy (SDH) Equipment Functional Blocks", 01/94, p. 61, Annex A.

* cited by examiner

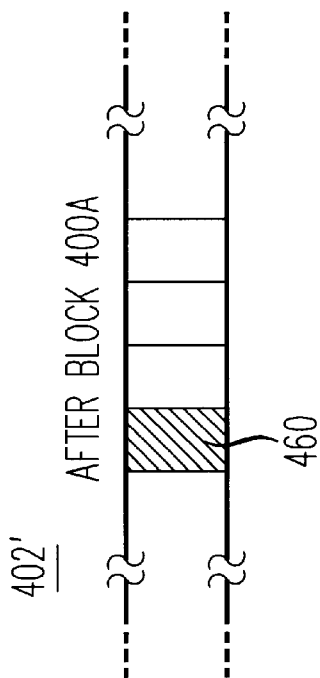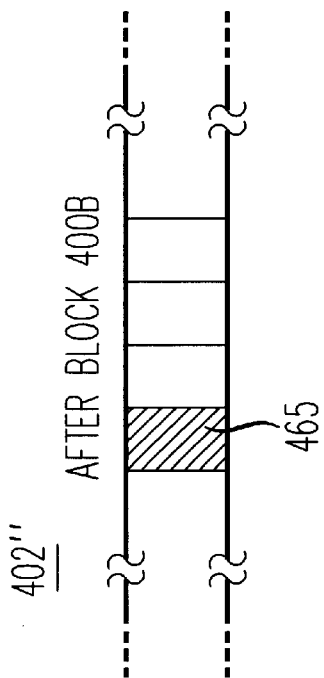
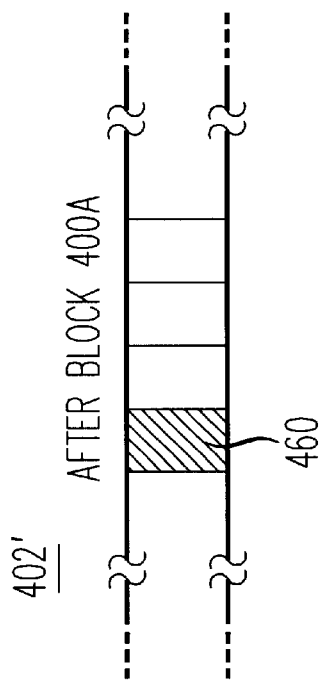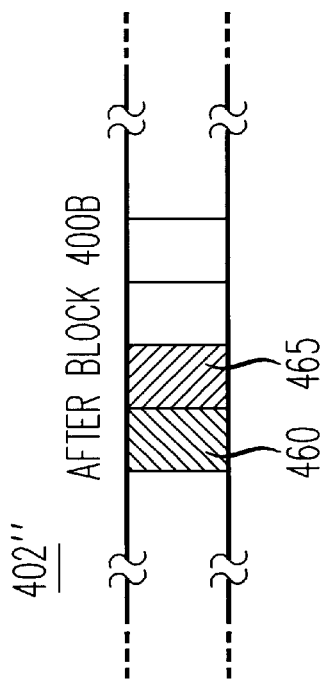

CONTROL ARCHITECTURE USING A MULTI-LAYER EMBEDDED SIGNAL STATUS PROTOCOL

CROSS REFERENCE TO RELATED APPLICATIONS

This application is related to our co-pending patent applications, Ser. No. 09/087,067 filed May 29, 1998, Ser. No. 08/942,095 filed on Oct. 1, 1997, and Ser. No. 08/942,096 filed on Oct. 1, 1997, all of which are herein incorporated by reference in their entirety.

FIELD OF THE INVENTION

This invention relates generally to digital transmission networks and, more particularly, to embedded control of signals transported through distributed elements in digital transmission networks.

BACKGROUND OF THE INVENTION

Digital transmission networks, such as those based on Synchronous Optical Network/Synchronous Digital Hierarchy (SONET/SDH) standards, are used extensively for transporting broadband communications signals. Network elements, such as multiplexers, digital cross-connect systems, and the like, are used in these transmission networks to support a number of different applications, including some that involve multiple switching functions. One example is "path-in-line" protection switching, also referred to as "virtual rings" or "ring-on-ring", which involves line switching over bidirectional line switched rings (BLSR) and path switching over unidirectional path switched rings (UPSR).

To support these types of applications, network elements include a routing structure, such as a switch fabric, to provide the necessary connections for routing signals through the transmission network. For example, distributed switch fabrics with a segmented control structure are typically used for applications involving multiple switching functions, whereby a separate control domain and separate switch fabric supports each of the separate switching functions. To facilitate the appropriate selection of signals by the distributed switch fabrics, control decisions are often based on the status of the signals, e.g., signal quality. However, existing control structures are known to have limited capability for propagating and utilizing signal status as signals are transported through distributed switch fabrics.

In one type of control structure, signal monitoring may be performed locally at each switch fabric location to derive signal status for the various input signals in order to facilitate switching decisions. Because each switch fabric is controlled by a separate complex control element, the signal status must be "rediscovered" at each subsequent switch fabric. Among other problems, rediscovery of signal status adds cost and complexity to the system because signal monitoring must be carried out at each switch fabric location. Moreover, not all types of signal status are capable of being rediscovered. For example, status information indicative of internal system faults or interface faults that occur locally at a given switch fabric does not necessarily propagate forward with the signal to succeeding switching points. As a result, this type of signal status information, which may be useful for subsequent switching decisions, cannot be rediscovered at succeeding switch fabrics.

In SONET-based systems, an alarm indication signal is typically used to alert downstream equipment that an upstream defect has been detected. However, an alarm indication signal is a separate maintenance signal and is not used to retain signal status, e.g., quality information, about a particular input signal. As such, an alarm indication signal does not propagate signal status through the network for individual input signals and, as a result, signal status for each input signal still must be rediscovered at each succeeding switching point using some type of signal monitoring function. In sum, rediscovery does not provide an effective means for resolving a cumulative signal status as the signal propagates through the various switch fabrics.

In another type of control structure, complex control elements for each of the separate switch fabrics may be coupled together in order to facilitate the sharing of signal status information among the various complex control elements. Although this arrangement may alleviate some of the problems otherwise associated with rediscovery of signal status, this arrangement has other disadvantages associated with the close coupling required between multiple control functions within a given complex control element as well as between separate complex control elements. For example, the extensive coordination required between the various control functions within a complex control element and between separate complex control elements results in undesirable switching delays.

SUMMARY OF THE INVENTION

Undesirable switching delays, the need for signal status rediscovery, and other problems associated with complex control schemes for distributed switch fabrics are avoided according to the principles of the invention by deriving signal status for each signal as it propagates along a transmission path, embedding signal status in each of the signals so that signal status is carried in at least one of a plurality of signal status layers, and selectively extracting the signal status from any of the layers to facilitate an appropriate selection decision at any switch fabric distributed along the transmission path. Importantly, multiple layers or levels of signal status can be embedded for any particular input signal. As a result, multiple layers of signal status can be used to provide a cumulative signal status of a particular signal as it propagates along the transmission path or to support various combinations of status control, such as each layer being used to track a different level or type of status for the signal.

By embedding multiple layers of signal status in each of the signals and supplying this signal status to control elements directly associated with a switch fabric, the control elements for each of the distributed switch fabrics can be decoupled from each other. Moreover, signal status propagates with each of the signals so that signal status is locally available and directly extractable at each selection point in the transmission path to facilitate the appropriate selection decisions. As a result, signal status does not have to be traced back through previous selection points as in prior arrangements. Control of the signal monitoring functions also becomes less complex according to the principles of the invention because signal status does not have to be rediscovered at all subsequent selection points. Using multiple layers of signal status also allows for a wide range of status control. For example, multiple quality levels or failure conditions can be propagated through the system for any particular input signal, thereby providing a cumulative signal status capability that can be used to support a number of different control requirements in the system.

BRIEF DESCRIPTION OF THE DRAWING

A more complete understanding of the principles of the invention may be obtained from consideration of the following detailed description in conjunction with the drawing, with like elements referenced with like references, in which:

FIGS. 6A and 6B show simplified diagrams illustrating the insertion of signal status according to the principles of the invention.

DETAILED DESCRIPTION OF THE INVENTION

It is well known that protection switching schemes are typically used in SONET/SDH networks so that communications can be maintained even if there are intermittent faults, outages, or failures on a given transmission path. Some examples of the types of network protection switching schemes used in SONET/SDH include: bi-directional line switched ring (BLSR), unidirectional path switched ring (UPSR), dual ring interworking (DRI), and 1+1 facility protection to name a few. Although the illustrative embodiments described herein are particularly well-suited for a "path-in-line" protection switching application in a SONET/SDH-based transmission network, and shall be described in that exemplary context for this application, those skilled in the art will understand from the teachings herein that the principles of the invention may also be employed in many other embedded control applications.

In the context of the following detailed description, the terms "network element", "routing structure", or "routing element" are intended to encompass all the various components known in the art that are used for routing, switching, or connecting signals. Consequently, the terms "switching", "routing", "selecting" and "connecting" are used interchangeably to refer to the handling of signals within a transmission path. One example of a routing structure contemplated herein is a switch fabric used in a digital transmission network element. However, examples used throughout the detailed description are illustrative only and the principles of the invention could apply to any type of signal interface that makes routing selections or decisions. It is also to be understood that the term "distributed" is meant to imply the cooperation between two separate elements. By way of example only, distributed switch fabrics could imply two separate elements within a system, such as two separate shelves of switch fabric within a chassis. Distributed fabrics could also imply two separate systems, such as geographically dispersed switch fabrics in separate chassis.

Network elements (NEs), such as digital cross-connect systems (DCS), typically include a number of port interfaces, one or more switch functions, and one or more control functions to implement a single switching application. In a distributed environment, multiple shelves of network components would be connected together. As an example, multiple shelves may be connected across an interface within a single chassis or multiple shelves may be connected across an interface between separate chassis.

Figure 1A:
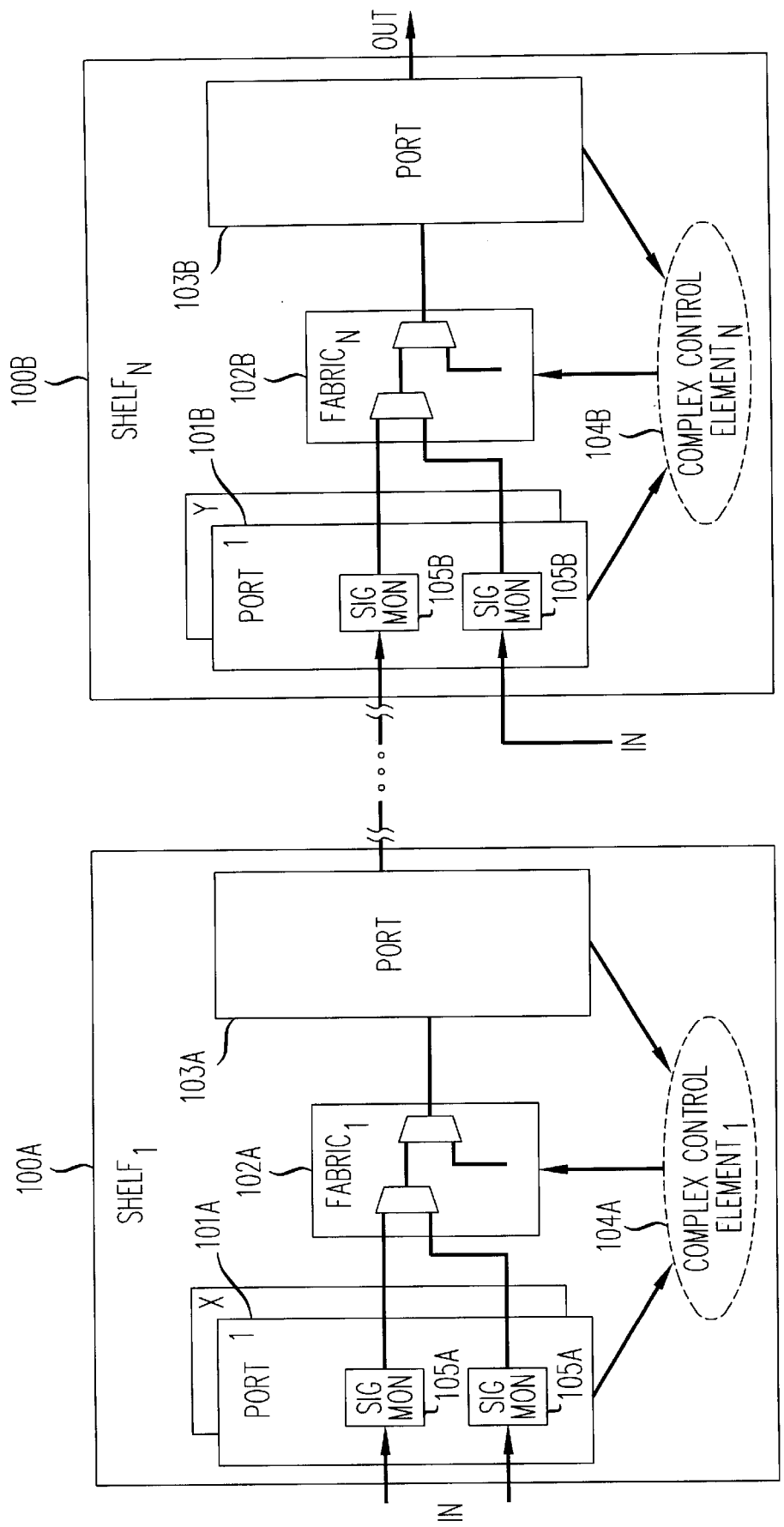
FIG. 1A is a simplified block diagram of a typical distributed switch fabric architecture with a segmented and complex control arrangement.

FIG. 1A shows a typical configuration having two equipment shelves, $shelf_1$ 100A and $shelf_N$ 100B, each of which is populated with a similar complement of network components. In a protection switching application, for example, $shelf_1$ 100A could be used for line switching on a BLSR and $shelf_N$ 100B could be used for path switching on a UPSR. As shown, $shelf_1$ 100A comprises port $interfaces_{1-x}$ 101A for receiving input signals, a switch fabric 102A, port interface 103A for passing signals from switch fabric 102A, and a complex control element 104A for controlling all port and switch functions within $shelf_1$ 100A. Similarly, $shelf_N$ 100B comprises port $interfaces_{1-y}$ 101B, switch fabric 102B, port interface 103B, and complex control element 104B. As shown, inputs to port $interfaces_{1-x}$ 101A and port $interfaces_{1-y}$ 101B can either be real system inputs or virtual inputs from previous shelves. For example, $port interface_1$ 101A in $shelf_1$ 100A is shown to receive real system inputs while $port interface_1$ 101B in $shelf_N$ 100B is shown to receive both a real system input as well as a virtual input from $shelf_1$ 100A. Port $interfaces_{1-x}$ 101A and port $interfaces_{1-y}$ 101B typically include a number of signal monitoring elements 105A and 105B, respectively, for monitoring the signal status of incoming signals.

In this particular segmented control arrangement, all input signals are coupled through signal monitoring elements 105A and 105B so that the status of each of the input signals can be identified prior to each selection or routing function carried out by the respective switch fabrics 102A and 102B. Because control functions 104A and 104B each independently control the components in shelves 100A and 100B, respectively, one particular disadvantage with this configuration is that any signal status determined at $shelf_1$ 100A for a given input signal will have to be "rediscovered" at $shelf_N$ 100B via signal monitoring functions 105B. Using the virtual input from $shelf_1$ 100A to $shelf_N$ 100B as an example, the signal status of this input signal is initially determined at $shelf_1$ 100A using signal monitoring element 105A and is then "rediscovered" at $shelf_N$ 100B using signal monitoring element 105B. Accordingly, each input signal in this type of system is typically only associated with one signal status because signal status is determined independently at each point of "rediscovery" without any cumulative status accounting. Another disadvantage with this configuration is that signal status for some conditions, e.g., a local equipment failure, will not propagate through the system. As such, this type of signal status may not be rediscoverable at subsequent selection points.

Figure 1B:
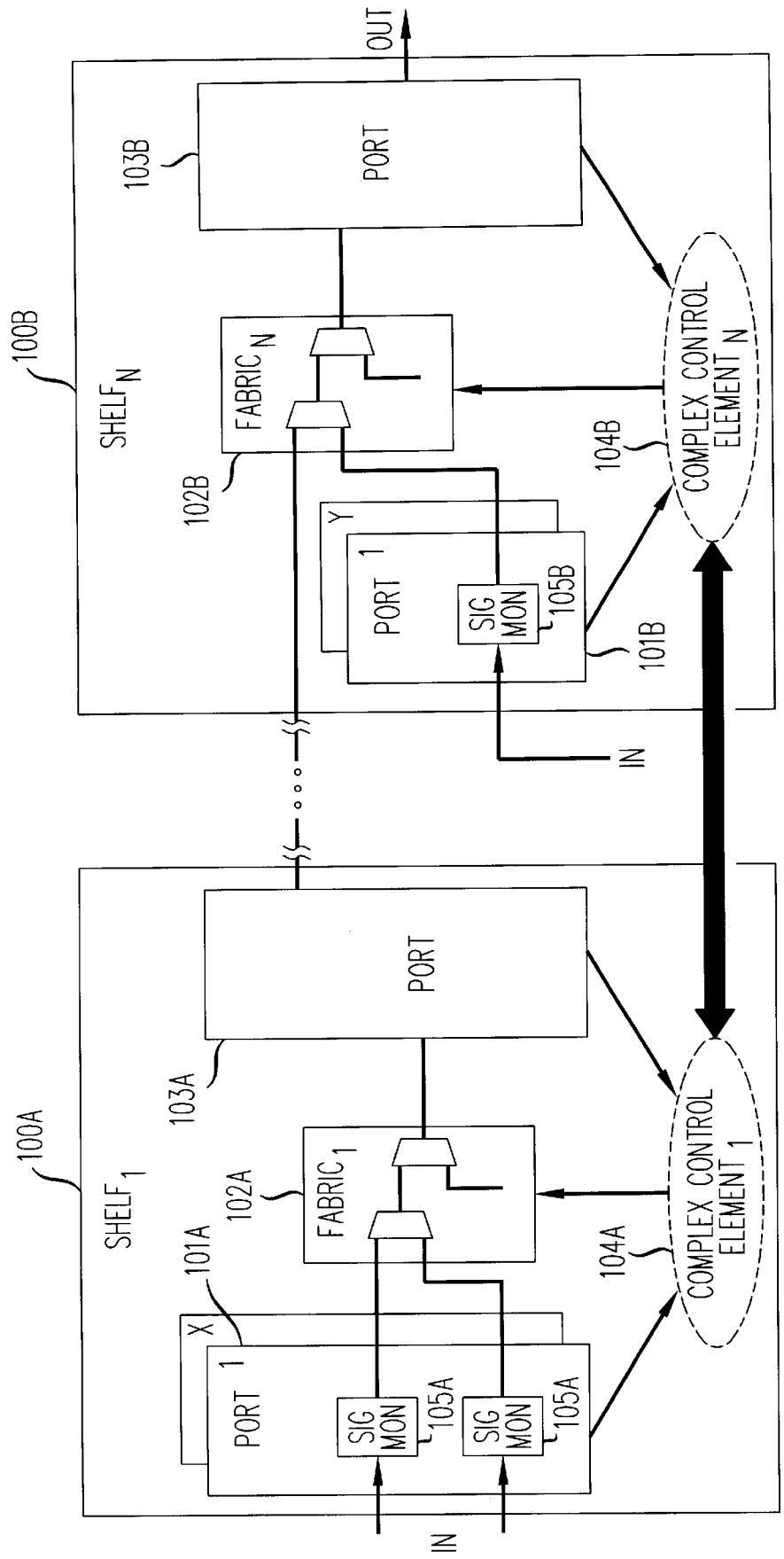
FIG. 1B is a simplified block diagram of another typical distributed switch fabric architecture with coupling between segmented complex control elements.

FIG. 1B shows another segmented control arrangement in which complex control elements 104A and 104B are coupled to each other so that signal status information and other control information can be shared between distributed components. By coupling together complex control elements 104A and 104B, the virtual inputs to shelf$_N$ 100B are not routed through signal monitoring components 105B. Instead, coupling between control elements 104A and 104B is used to exchange signal status information for those input signals that are passed from shelf$_1$ 100A to shelf$_N$ 100B.

Figure 1C:
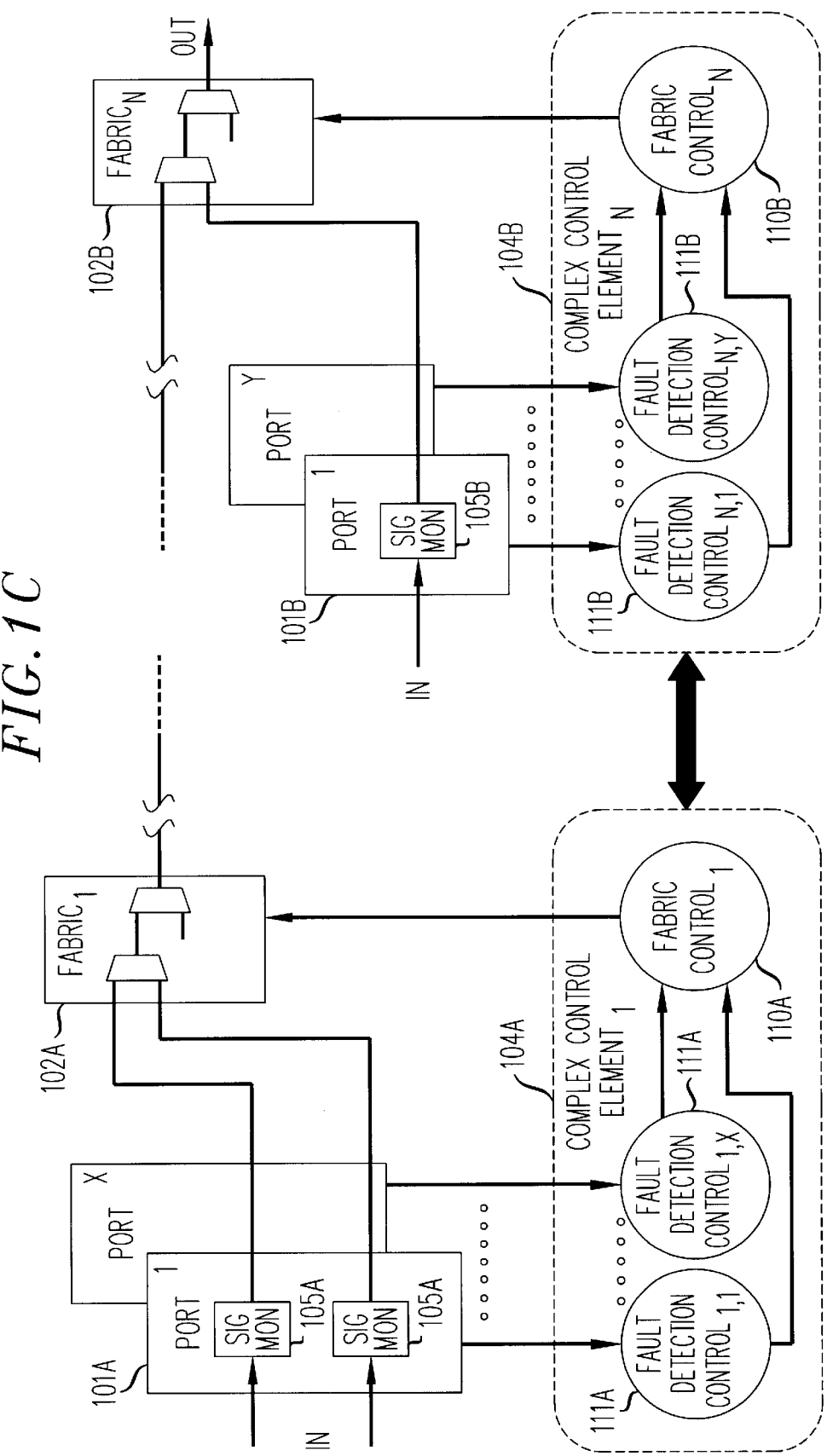
FIG. 1C shows an expanded functional block diagram of the control elements shown in FIG. 1B.

FIG. 1C shows an expanded view of the coupling of complex control elements 104A and 104B from FIG. 1B. Illustratively, complex control element 104A includes fabric control$_1$ 110A coupled to non-fabric controls, such as fault detection controls$_{1,1}$ through fault detection controls$_{1,x}$ 111A. As shown in this example, a fault detection control 111A is associated with each input signal 1 to x of shelf$_1$. Fault detection controls 111A are coupled to signal monitoring elements$_{1-x}$ 105A within port interfaces$_{1-x}$ 101A. Similarly, complex control element 104B includes fabric control$_N$ 110B coupled to non-fabric controls such as fault detection controls$_{N,1}$ through fault detection controls$_{N,y}$ 111B. Similarly, a fault detection control 111B is associated with each input signal 1 to y of shelf$_N$. Fault detection controls 111B are coupled to signal monitoring elements$_{1-y}$ 105B within port interfaces$_{1-y}$ 101B.

Prior to any protection switching decision by fabric$_N$ 102B in response to fabric control$_N$ 110B, signal status must be resolved for all input signals. For example, signal status must be resolved for inputs to shelf$_N$ via fault detection controls$_{N,1}$ through fault detection controls$_{N,1}$ 111B as well as for inputs from previous switching points, such as for inputs to shelf$_1$ via fault detection controls$_{1,1}$ through fault detection controls$_{1,x}$ 111A. Therefore, complex control element 104B must be fully coupled to complex control elements at previous switching points, such as control element 104A. As previously described, this type of control arrangement has numerous disadvantages in terms of the extensive coordination required between the various control functions and the associated delays in selection decisions. In sum, these arrangements do not provide a performance-optimized control architecture that can support multiple switching and cross-connection functions for protection switching applications using distributed switch fabrics.

According to the principles of the invention, the problems with the above arrangements are avoided by using a multi-layer embedded signal status. This multi-layer embedded signal status reduces the overall complexity of the control system because multiple control functions do not have to be closely coupled to facilitate selection decisions. In general, the teachings of the present invention are particularly applicable for control of distributed system architectures because the cumulative capability of the embedded signal status eliminates the need to couple control functions throughout a network or system and, therefore, reduces the cost, complexity, and overhead that is normally found in prior systems.

Figure 2:
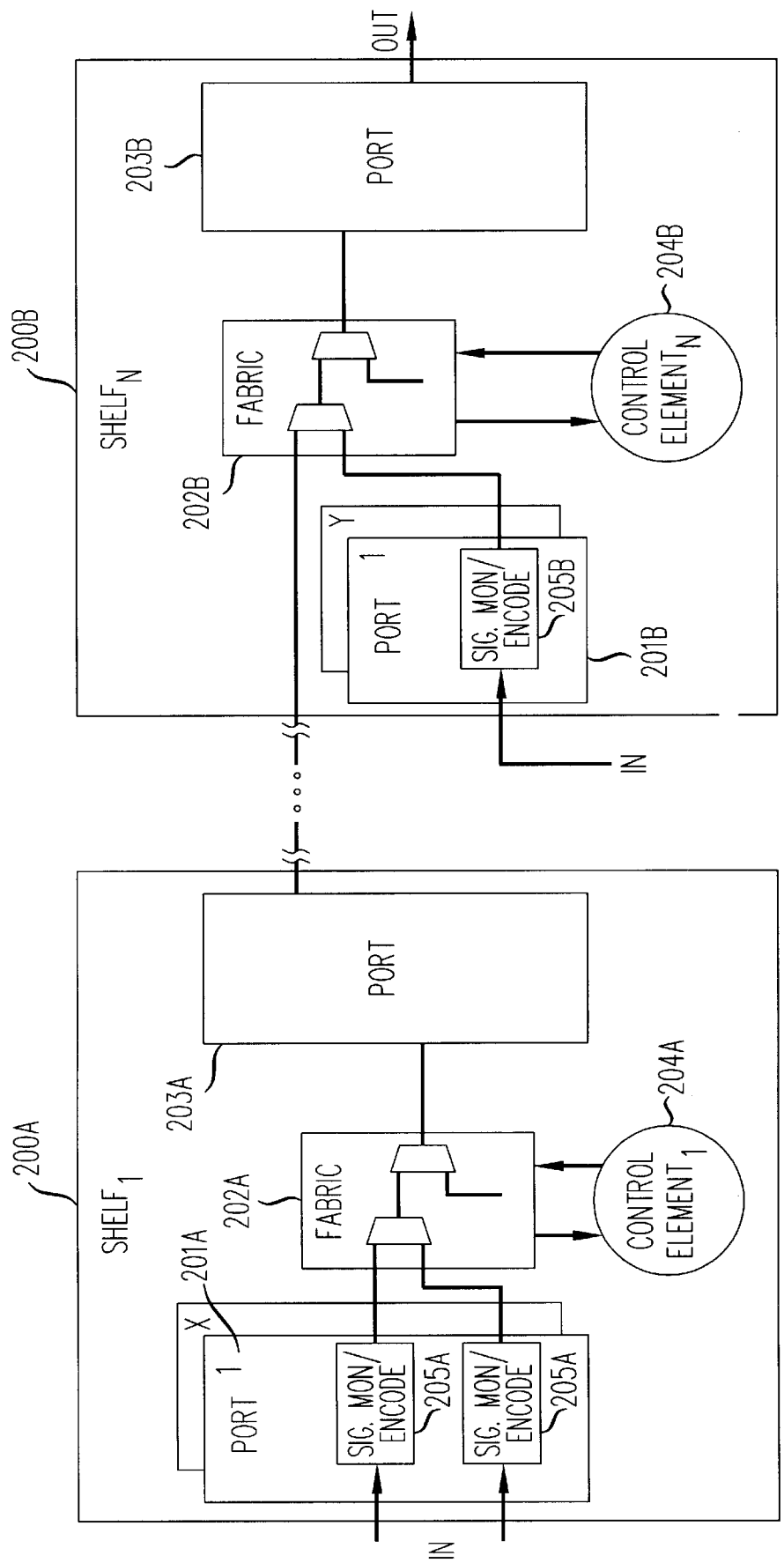
FIG. 2 is a simplified block diagram showing the decoupled control arrangement for distributed switch fabrics according to the principles of the invention.

FIG. 2 shows an illustrative embodiment of a digital transmission application in which the principles of the invention may be employed. More specifically, FIG. 2 shows a configuration of distributed switch fabrics in N equipment shelves. For ease of illustration, only two equipment shelves, shelf$_1$ 200A and shelf$_N$ 200B, are shown, each of which are populated with a similar complement of network components. Shelf$_1$ 200A comprises port interfaces$_{1-x}$ 201A for receiving input signals, a switch fabric 202A, port interface 203A for passing signals from switch fabric 202A, and at least one control element 204A for controlling switch fabric 202A. It should be noted that an equipment shelf, such as shelf$_1$ 200A, could also include multiple layers of switch fabric sharing the same backplane. Similarly, shelf$_N$ 200B comprises port interfaces$_{1-y}$ 201B, switch fabric 202B, port interface 203B, and control element 204B.

As shown, inputs to port interfaces$_{1-x}$ 201A and port interfaces$_{1-y}$ 201B can either be real inputs (e.g., external input to the system) or virtual inputs from previous shelves (e.g., inputs from within the system). For example, port interface$_1$ 201A in shelf$_1$ 200A is shown to receive real inputs while port interface$_1$ 201B in shelf$_N$ 200B is shown to receive both a real input as well as a virtual input from shelf$_1$ 200A. In practice, virtual inputs (e.g., input to shelf$_N$ 200B from shelf$_1$ 200A) may be across a proprietary internal interface between common equipment, while real inputs may be a non-proprietary interface signals, such as SONET-compliant inputs.

Port interfaces$_{1-x}$ 201A and port interfaces$_{1-y}$ 201B can include signal monitoring/encoding elements 205A and 205B, respectively, for monitoring incoming signals and encoding the status of the incoming signals. Port interfaces$_{1-x}$ 201A and port interfaces$_{1-y}$ 201B pass the signals along with the encoded status to switch fabrics 202A and 202B, respectively. In operation, control elements 204A and 204B are adapted to receive signal status information for each of the input signals and further adapted to provide a control input to switch fabrics 202A and 202B to effect selection decisions. As will be described in further detail, the down arrow into control elements 204A and 204B represents signal status information, e.g., quality information extracted for incoming signals, and the up arrow from control elements 204A and 204B represents the control input to the respective switch fabric to facilitate an appropriate selection decision.

By using segmented control according to the principles of the invention, switch fabrics 202A and 202B are controlled locally in that only signal status information that is local to a particular selection function within the respective switch fabric is used to make the appropriate selection decision. This localized control is achieved by using the embedded signal status, whereby signal status information is encoded along with the signal data for each of the inputs to switch fabrics 202A and 202B. Consequently, signal status information propagates along with the signal data through the switching points. Because the signal status information is locally available at each switching point, a selection decision can be made without having to trace back and resolve signal status for previously selected input signals as in prior arrangements.

Unlike some prior arrangements, control elements 204A and 204B are substantially decoupled to further reduce the complexity of the control scheme. In particular, control element 204A is decoupled from port interfaces$_{1-x}$ 201A and 203A, control element 204B is decoupled from port interfaces$_{1-y}$ 201B and 203B, and control elements 204A and 204B are decoupled from each other. As such, control elements 204A and 204B can independently control equipment in shelves 200A and 200B, respectively. Moreover, because signal status information propagates along with the signals between shelves 200A and 200B, signal status information does not have to be "rediscovered" as is the case for prior systems. Overall signal monitoring requirements are therefore reduced in this control arrangement because virtual inputs to subsequent switch fabrics do not have to be monitored for signal status. Instead, embedded signal status information is locally available and directly extractable at each subsequent switching point for any given input signal. Specifically, the encoded signal status information can be decoded as needed to facilitate a switching decision at any particular switching point within the transmission path.

Figure 3:
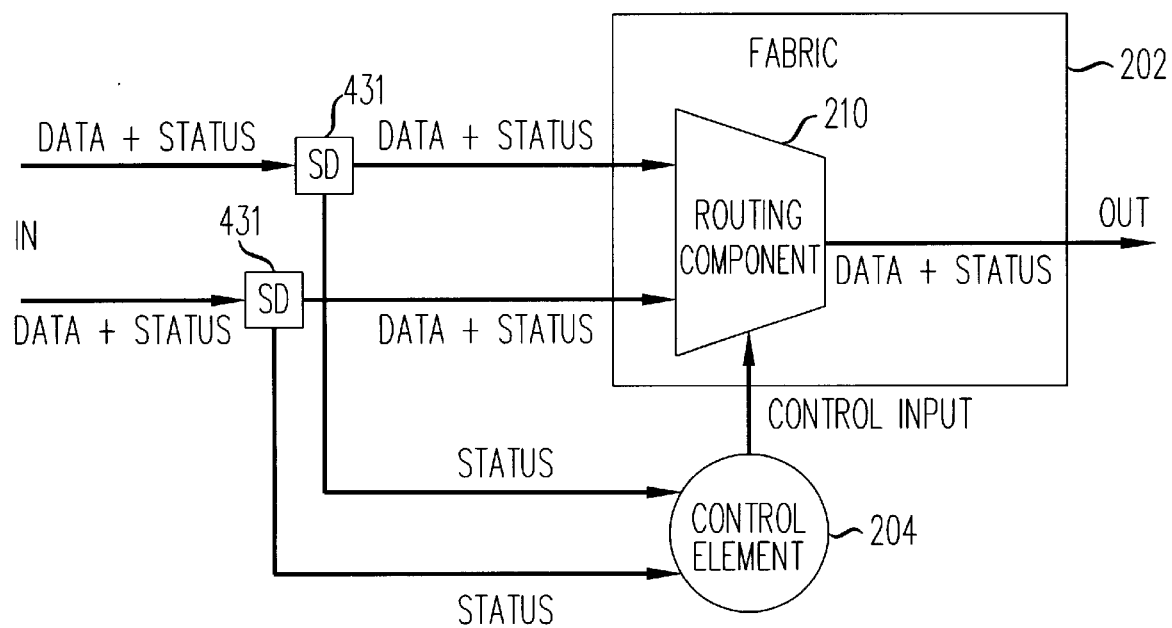
FIG. 3 shows a simplified flow diagram illustrating the signal flow to a switch fabric according to the principles of the invention.

FIG. 3 shows an expanded view of the signal flow between control element 204 and switch fabric 202. To promote clarity of presentation and understanding, FIG. 3 shows a single routing component 210 (e.g., selector 210) in switch fabric 202. However, it should be noted that many types of routing structures having complex hardware and/or software implementations are contemplated for switch fabric 202. Examples could include an array of hardware selectors, link lists, as well as other implementations known to those skilled in the art.

Referring again to FIG. 3, a status decoding element 431 is provided at each input to selector 210 for locating the encoded status information carried within the respective input signal. As will be described in more detail, status decoding element 431 decodes the encoded status information and passes the decoded status information on to control element 204. It should be noted that the encoded status of each input signal could also continue to propagate along with the input signal beyond status decoding element 431 to selector 210. Control element 204 uses appropriate control logic to generate a control input signal to selector 210. The control input signal, shown by the up arrow from control element 204, could include the address of the particular input signal to be selected by selector 210 in switch fabric 202. In response to the control input signal, selector 210 then switches the appropriate output signal from fabric 202.

In one exemplary embodiment, control element 204 comprises control logic for generating the control input signal to resolve an address of a particular input signal based on the embedded signal status for each of the input signals. For example, control logic may include multiple stages of selectors and associated domain control elements selectively configured to resolve an address of a single input signal based on performance criteria for a particular application, such as "path-in-line" protection switching. U.S. patent application Ser. No. 08/942,096, entitled "A Control Architecture for a Homogeneous Routing Structure" (Bordogna 4-7-8-2-3), which is incorporated herein by reference, describes one approach for implementing the control logic for control element 204.

As will be described below, the embedded signal status information associated with each of the input signals is not removed during any of the control or switching operations and, as a result, signal status can be preserved through the system. As compared with prior arrangements, the embedded signal status according to the principles of the invention eliminates the need to interface control element 204 with any type of fault detection controls in the port interfaces. More specifically, selection decisions are based on signal status information that is locally available and directly extractable at each individual switching point so that control of the switch fabric can be fully decoupled from other control functions.

Figure 4A:
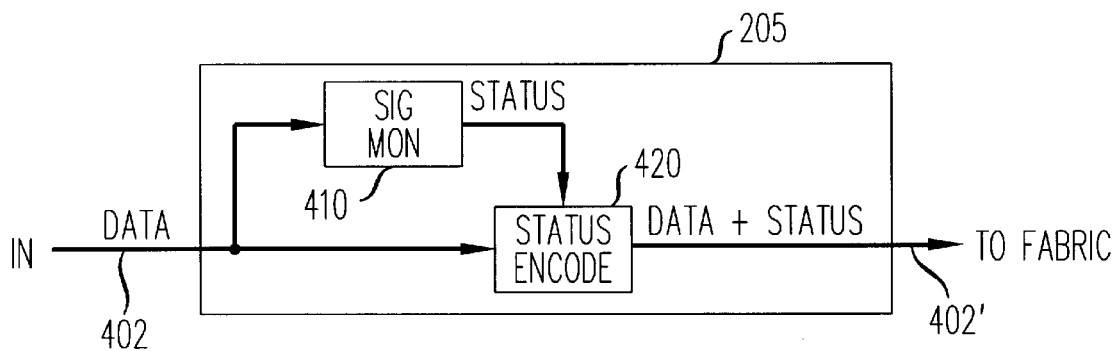
FIG. 4A shows a simplified functional block diagram illustrative of one embodiment for embedding signal status in a signal.

FIG. 4A is a simplified flow diagram showing how signal status is embedded within an input signal. In general, an input signal 402 is provided to both a signal monitoring element 410 and to a status encoding element 420 within signal monitoring/encoding element 205. Based on predetermined failure conditions or other performance criteria, signal monitoring element 410 supplies a signal status to status encoding element 420. Status encoding element 420 embeds the signal status information and supplies the data from the input signal along with its embedded signal status information as output signal 402'. Those skilled in the art will recognize that signal monitoring element 410 and status encoding element 420 can be implemented using techniques well known in the art. By way of example only, signal status can be combined with signal data in many different ways, such as by using a telemetry channel, or by modulating the amplitude, frequency, or phase of the signal data to name a few. As will be described in more detail, control information or command requests can also be embedded in the signal data in addition to monitored signal status.

As shown in FIG. 4A, input signal 402 includes data while output signal 402' includes data plus embedded signal status information. By embedding signal status information along with the data, it becomes apparent that additional overhead is therefore added to the signal. However, various techniques known to those skilled in the art can be used to accommodate the additional overhead requirements consistent with the teachings herein. Using a SONET transmission application as an example, the additional embedded signal status can be carried in unused overhead bytes. Another approach may be to increase the bit rate of transmission, thereby increasing the number of available time slots for transmitting the additional overhead. Other known techniques are also contemplated for use in the invention.

Figure 4B:
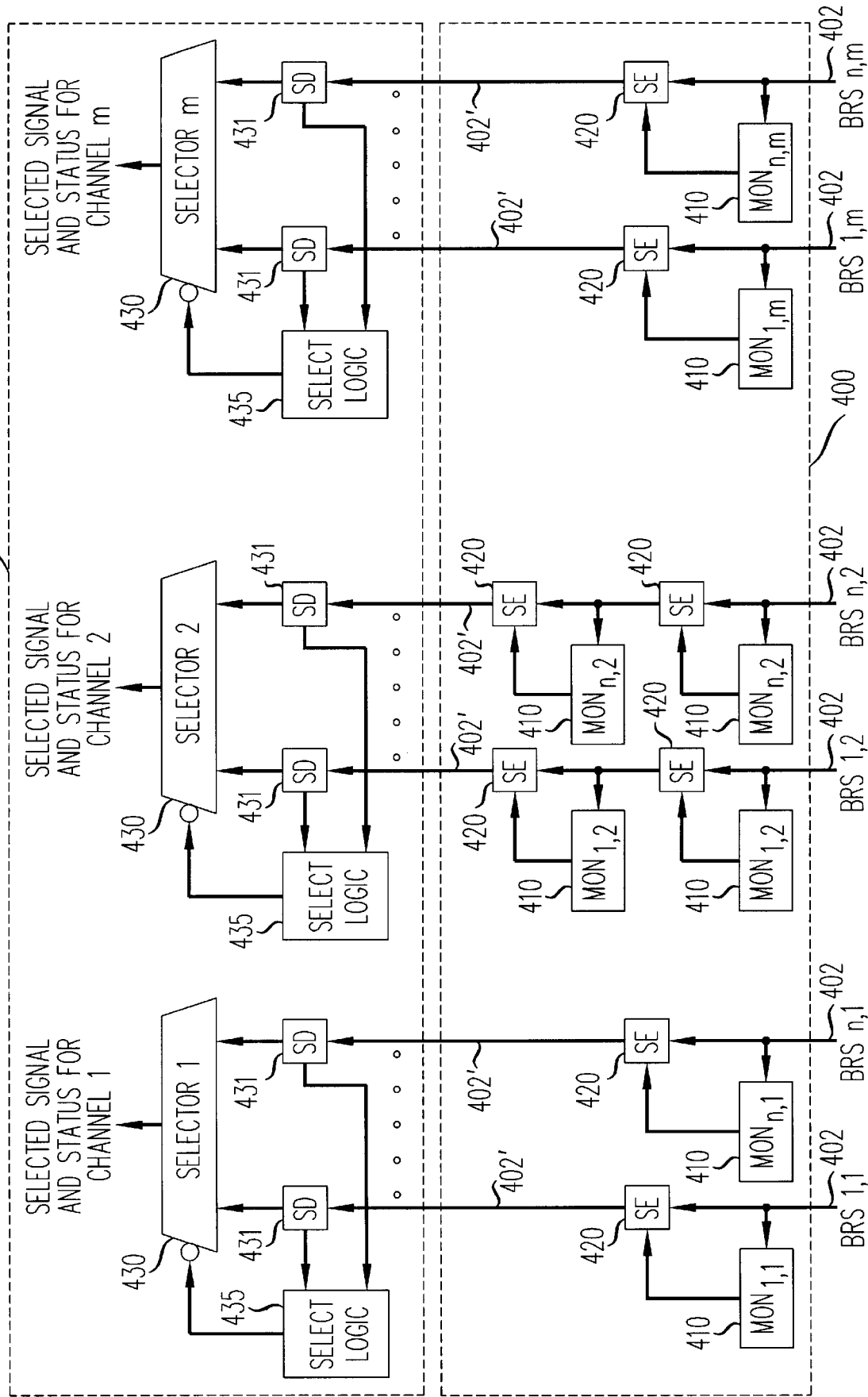
FIG. 4B shows a simplified block diagram of an illustrative embodiment of the invention.

FIG. 4B shows one illustrative embodiment of the invention for digital transmission networks in which a signal interface portion 400 and a signal switch portion 401 are provided. These blocks could be co-located in the same chassis or could be located in separate chassis. As compared with the embodiment shown in FIG. 2, signal interface portion 400 would include some of the functions of port interfaces 201 and signal switch portion 401 would include some of the functions of switch fabric 202 and control element 204.

As shown, signal interface portion 400 receives a plurality of base rate signals 402 as input signals, shown here as $BRS_{i,j}$, wherein i=1 to n and j=1 to m. More specifically, signal interface portion 400 receives m channels of input signals, wherein each of the m channels includes n input signals. As shown, channel 1 includes base rate signals $BRS_{1,1}$ through $BRS_{n,1}$, channel 2 includes base rate signals $BRS_{1,2}$ through $BRS_{n,2}$, and channel m includes base rate signals $BRS_{1,m}$ through $BRS_{n,m}$, and so on. Accordingly, $BRS_{1,1}$ represents the 1st base rate signal of channel 1, $BRS_{n,1}$ represents the nth base rate signal of channel 1, $BRS_{1,m}$ represents the 1st base rate signal of channel m, $BRS_{n,m}$ represents the nth base rate signal of channel m, and so on. As is well known, a base-rate signal is a signal of a fundamental rate or structure, which could also be combined with other similar base-rate signals to create a higher rate and/or more complex signal.

Interface portion 400 includes a plurality of independent signal monitoring elements 410 corresponding to each of the base rate signals 402, shown here as $MON_{i,j}$, wherein i=1 to n and j=1 to m consistent with the labeling conventions previously described for the base rate signals. For example, $MON_{n,m}$ represents quality monitor for the nth base rate signal of channel m. Interface portion 400 further includes a plurality of status encoding elements 420.

In operation, an independent signal monitoring element 410 measures the signal quality and/or state of a corresponding base rate signal 402 and reports this signal quality for the base rate signal 402 to a respective status encoding element 420. Status encoding element 420 is a signal status encode function which embeds the signal status information supplied by signal monitoring element 410 by inserting an encoded value representing the quality or state of the respective base rate signal 402. It should be noted that many different quality and/or status levels are available for encoding via status encoding element 420. As such, a wide range of status control can be supported because many different status codes, each possibly representing a different status condition (e.g., quality, time-related parameters, etc.), may be encoded along with the signal. Status encoding element 420 supplies the data from the input signal along with its embedded signal status information as an output signal 402' as previously described for FIG. 4A.

From this point forward and within the architectural bounds of the system, base rate signal 402' now contains both its original data along with its encoded status. As such, the signal status propagates through the system, thereby eliminating the need to "rediscover" the signal status at any subsequent stage in the system. In the case of prior systems, the signal would typically have to be monitored again at any subsequent input port to "rediscover" its signal status before the next selection decision could be made. Moreover, the illustrative embodiments of the present invention allow for monitoring at the interface boundary where the signal first enters the system as compared with prior systems that require monitoring functions throughout the system and/or complex control structures to share information between control functions.

Signal switch portion 401 includes a plurality of status decoding elements 431 for decoding signal status information embedded within each of the base rate signals 402'. Signal switch portion 401 further includes a plurality of base rate selectors 430 which select the appropriate base rate signals 402' based on a control signal supplied by a corresponding select logic element 435. As shown, signal switch portion 401 is an m-channel base-rate signal selector switch having m selectors 430 for selecting the corresponding base rate signals to be provided as output for the m channels.

In operation, base rate signals $BRS_{1,1}$ through $BRS_{n,m}$ with their respective embedded signal status information, shown here as base rate signals 402', are provided as input to signal switch portion 401. Status decoding elements 431 receive base rate signals 402', decode the encoded signal status information, and supply the decoded signal status information to select logic element 435. Base rate signals 402' are also provided as input to selectors 430. As compared with FIGS. 2 and 3, select logic 435 in FIG. 4B performs the equivalent tasks of control element 204. In particular, select logic element 435 evaluates the quality and/or status of all inputs associated with the base rate selector 430 under its control and provides an appropriate control signal to enable its corresponding selector 430 to choose the most appropriate input signal in accordance with the embedded signal status information and the given selection criteria. More specifically, each selector 430 selects a base rate signal 402' corresponding to one of the m channels which is then provided as output from signal switch portion 401. Each selector 430 receives n base rate signals 402' as inputs from which to select. For example, selector 1 receives $BRS_{1,1}$ through $BRS_{n,1}$, selector 2 receives $BRS_{1,2}$ through $BRS_{n,2}$, selector m receives $BRS_{1,m}$ through $BRS_{n,m}$, and so on.

It should be noted that status decoding elements 431 do not remove the encoded status information from base rate signals 402' and, consequently, the output of each selector 430 contains the selected base rate signal 402' which includes the original data for that signal along with the encoded status that was inserted at interface portion 400.

Because encoded signal status information is transported with each base rate signal from input to output, this architecture assures that all switching decisions can be made locally at each signal switch portion 401. Importantly, this architecture eliminates the need to share signal status information across functional portions using a complex (overlay) control structure. Moreover, this architecture directly supports multiple levels or stages of switching that can be either centralized or distributed.

Figure 4C:
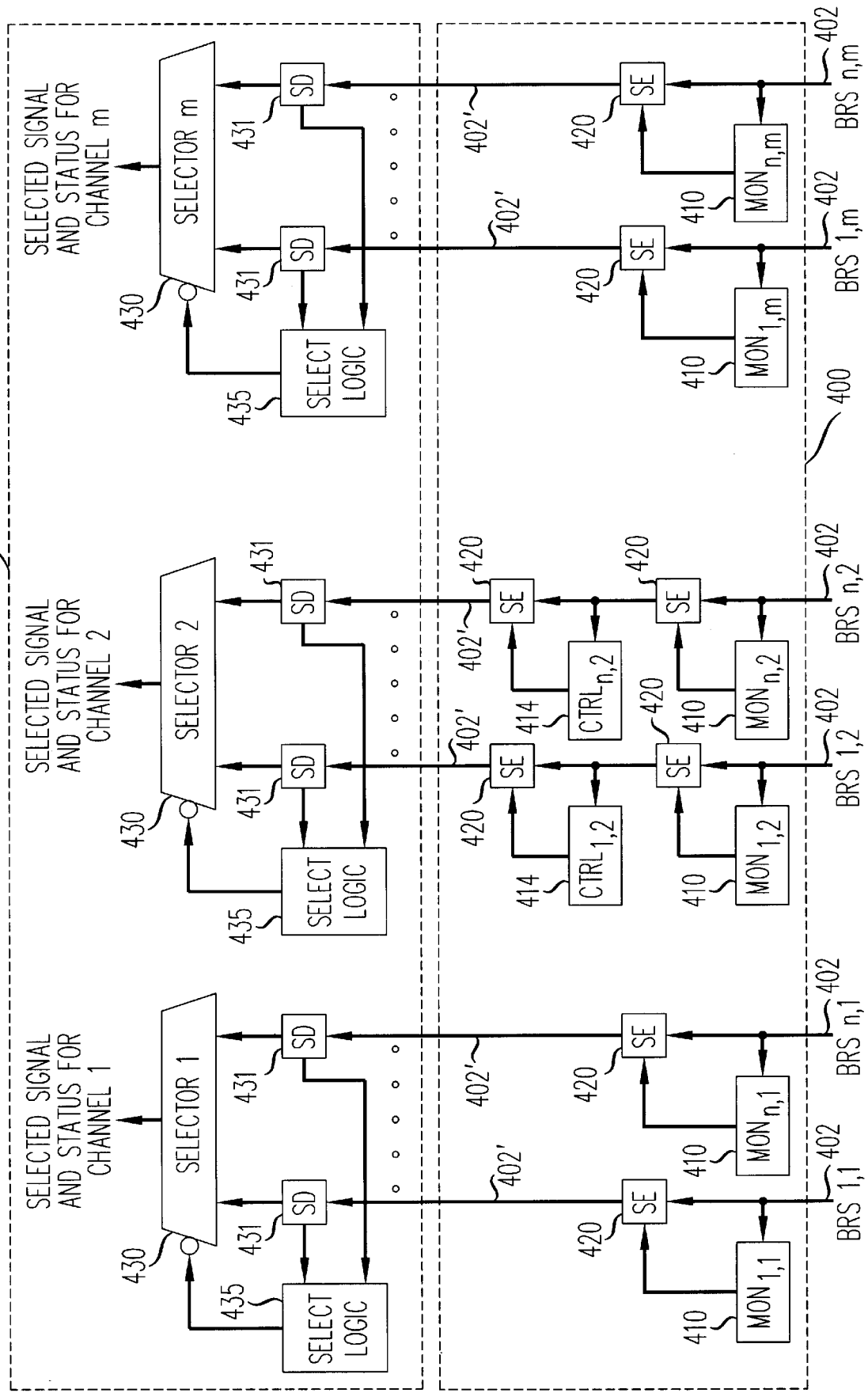
FIG. 4C is a simplified block diagram of another illustrative embodiment of the invention.
Figure 5:
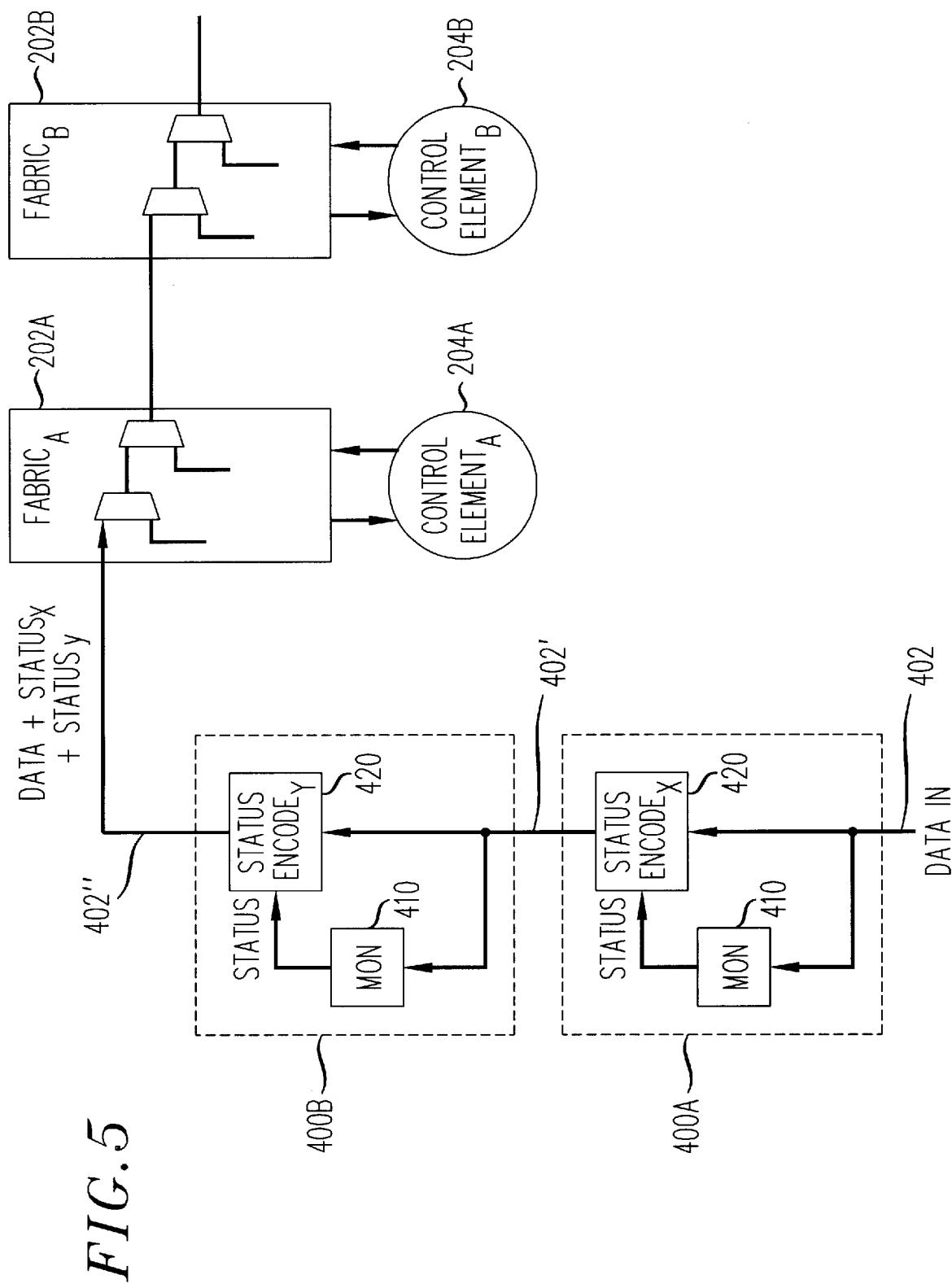
FIG. 5 shows a simplified functional block diagram of another embodiment of the invention helpful to understanding the multi-layered and cumulative aspects of the embedded signal status.

FIGS. 4B, 4C and 5 illustrate another important aspect of the invention in which the embedded signal status comprises multiple layers of signal status. For example, as an input signal propagates through the system, layers of signal status can be added to the signal at selected monitoring and encoding points so that the input signal acquires a cumulative signal status. As a result, any given input signal can be encoded with multiple layers of status, e.g., more than one signal status code. Any given layer of the multiple layers of signal status may then be used, individually or in combination with other layers, to facilitate a selection decision at any particular switching point in the system.

Referring to FIG. 4B, $BRS_{1,2}$ through $BRS_{n,2}$ are shown to propagate through several layers of signal monitoring and encoding using a plurality of signal monitoring elements 410 and status encoding elements 420 whereby a plurality of status codes can be embedded in the input signals in the manner previously described. In this example, select logic 435 corresponding to selector 2 may be adapted to control a selection decision for selector 2 based on any of the given status codes (i.e., based on any of the signal status layers carried by the base rate signal).

FIG. 4C shows another variation of the embodiment shown in FIG. 4B, whereby control information or command requests can be inserted into the system via control insertion elements 414 instead of or in addition to monitored signal status which is derived from signal monitoring elements 410. As referenced herein, signal monitoring is used in the context of monitoring an input signal to derive raw signal status attributes from that input signal. By comparison, control insertion is meant to refer to the application of some form of control to the input signal to bring about a desired result. By way of example only, control insertion could include a command request, e.g., a manual switch request, or a test insertion request, or the like.

In FIG. 4C, $BRS_{1,2}$ through $BRS_{n,2}$ are shown to propagate through several layers of signal monitoring (via $MON_{1,2}$ through $MON_{n,2}$) and control insertion (via $CTRL_{1,2}$ through $CTRL_{n,2}$). At each layer, the appropriate status, whether derived from signal monitoring elements 410 or control insertion elements 414, is encoded and embedded within $BRS_{1,2}$ through $BRS_{n,2}$ using a corresponding status encoding element 420. By using a multi-layer embedded signal status architecture according to the principles of the invention, any combination of control insertion and/or signal monitoring can be supported for any given input signal. Moreover, uniformity is not required within the individual layers or within a particular input signal. As such, control or monitored status can be inserted at any point within a transmission path for use in any subsequent selection decision. It should be noted that FIG. 4C is just one exemplary configuration embodying the principles of the invention. As such, various other modifications will be apparent to those skilled in the art consistent with the teachings herein.

FIG. 5 shows an example of one practical implementation of the multi-layered signal status in a distributed switch fabric arrangement. In particular, FIG. 5 shows a simplified representation of the fabric and control functions from FIG. 2 together with a portion of the signal monitoring and encoding functions as shown in FIGS. 4A through 4C. As shown, $fabric_A$ 202A and $fabric_B$ 202B receive an input signal 402" having multiple layers of signal status. More specifically, block 400A receives base rate signal 402 and adds one layer of signal status, e.g., status$_X$, using signal monitoring element 410 and status encoding element 420. At the output side of block 400A, base rate signal 402' now includes the original data from base rate signal 402 and the embedded signal status$_X$ added by block 400A. Block 400B receives base rate signal 402' and adds another layer of signal status, e.g., status$_Y$, using signal monitoring element 410 and status encoding element 420 in block 400B. At the output side of block 400B, base rate signal 402" now includes the original data from base rate signal 402, the embedded signal status$_X$ added by block 400A, and the embedded signal status$_Y$ added by block 400B.

In one exemplary scenario, the embedded signal status within base rate signal 402" can be decoded so that control element$_A$ 204A uses status$_X$ to facilitate a selection decision in fabric$_A$ 202A, while control element$_B$ 204B uses status$_Y$ to facilitate a selection decision in fabric$_B$ 202B. Expanding on this example, status$_X$ may be used to represent a status code for network failures relating to the transport of ATM cells, while status$_Y$ may be used to represent a status code for particular equipment failures within a facility, e.g., failure in an internal circuit pack. As such, fabric$_A$ 202A may use status$_X$ to make selection decisions based on ATM failure information, while fabric$_B$ 202B may use status$_Y$ to make equipment protection switching selection decisions based on equipment failure information. Regardless of the implementation choice, the important aspect is that multiple layers of signal status can be embedded within an input signal and used at any switching point within the system to facilitate appropriate selection decisions. Moreover, the use of the multi-layered embedded signal status eliminates the need for any coupling between control elements, such as between control element$_A$ 204A and control element$_B$ 204B.

The multi-layered embedded signal status architecture according to the principles of the invention is a very flexible architecture in that the embedded multi-layered signal status can be used in a number of different implementations. For example, a single layer of embedded signal status can be used to support a separate control function or application. Specifically, each status encoding element 420 would encode signal status into the same layer by overwriting the previous signal status code or value with an updated signal status code or value.

In another example, multiple layers of signal status can be used so that each layer addresses a different level or type of signal status. Using a SONET application as an example, one layer of the signal status protocol may deal with one level or type of signal status, such as failures at the virtual tributary (VT) level, while another layer may deal with another level or type of signal status, such as failures at the synchronous transport signal (STS) level, and so on.

In yet another example, multiple layers of signal status can be used to cumulatively track the same level or type of signal status as the signal propagates through the system without overwriting the signal status in any given layer. More specifically, each status encoding element 420 would encode the respective signal status into a different layer at each monitoring/encoding point in the system, but each of the layers is used collectively to provide a cumulative signal status. With this use of the multi-layered, embedded signal status, a "trace" can be maintained as a signal propagates through the system. Using SONET as an example, each layer can be used to add the same type of path level status for a signal as it propagates through each monitoring/encoding point in the system. This type of trace would also be useful for fault isolation, fault identification, and/or fault segmentation applications.

FIGS. 6A and 6B illustrate simplified examples in the context of the embodiment shown in FIG. 5 of how multiple layers of signal status can be used in accordance with the above schemes. In particular, FIG. 6A represents how signal status information can be progressively added to provide a cumulative signal status for a base rate signal and FIG. 6B represents how signal status information can be progressively added to a base rate signal in an overwrite mode.

Referring to FIG. 6A, base rate signal 402' includes signal status information added by block 400A (from FIG. 5) shown here as status 460. After being processed through block 400B (FIG. 5), base rate signal 402" now includes status 460 added by block 400A in addition to status 465 added by status encoding elements within block 400B. Consequently, status 460 and status 465 can be used for cumulatively tracking the same level or type of signal status in multiple layers to facilitate selection decisions at subsequent points in the transmission path.

It should also be noted that FIG. 6A is applicable for illustrating the other exemplary scheme described above in which different layers are used to track a different level or type of signal status as opposed to cumulatively tracking the same level or type of signal status in multiple layers. Using an example previously described, status 460 may be used to address failures at the virtual tributary (VT) level, while status 465 may be used to address failures at the synchronous transport signal (STS) level, and so on.

Referring now to FIG. 6B, base rate signal 402' includes signal status information added by block 400A (from FIG. 5) shown here as status 460. After being processed through block 400B (FIG. 5), status 460 is overwritten by new or updated status 465 in base rate signal 402". Consequently, the same layer of embedded signal status is used to support a separate control function or application as the signal propagates through the system.

Although only two layers of signal status are shown in FIGS. 6A and 6B for ease of illustration, any number of layers is contemplated by the teachings of the invention. It should also be noted that various combinations of the above-described schemes may also be used consistent with the principles of the invention.

As described, control of distributed systems can be based on a multi-layered signal status that is derived from other than signal monitoring functions. As an example, multiple layers of the signal status protocol can be used to support manual requests or for performing maintenance-type functions throughout a distributed system. Building on this example, a high level test macro could be embedded at one location in the system and propagated along with the signal to control appropriate test actions at subsequent locations in the system. Stated otherwise, in response to the test macro, a given test function would be performed at each subsequent location in the system. For example, one location may perform a loopback function in response to the embedded test macro, another location may generate a test signal, while yet another location may measure signal levels, and so on. This example is intended to be illustrative only and those skilled in the art will be able to identify other suitable implementations for the multi-layered signal status consistent with the principles of the present invention.

Figure 7:
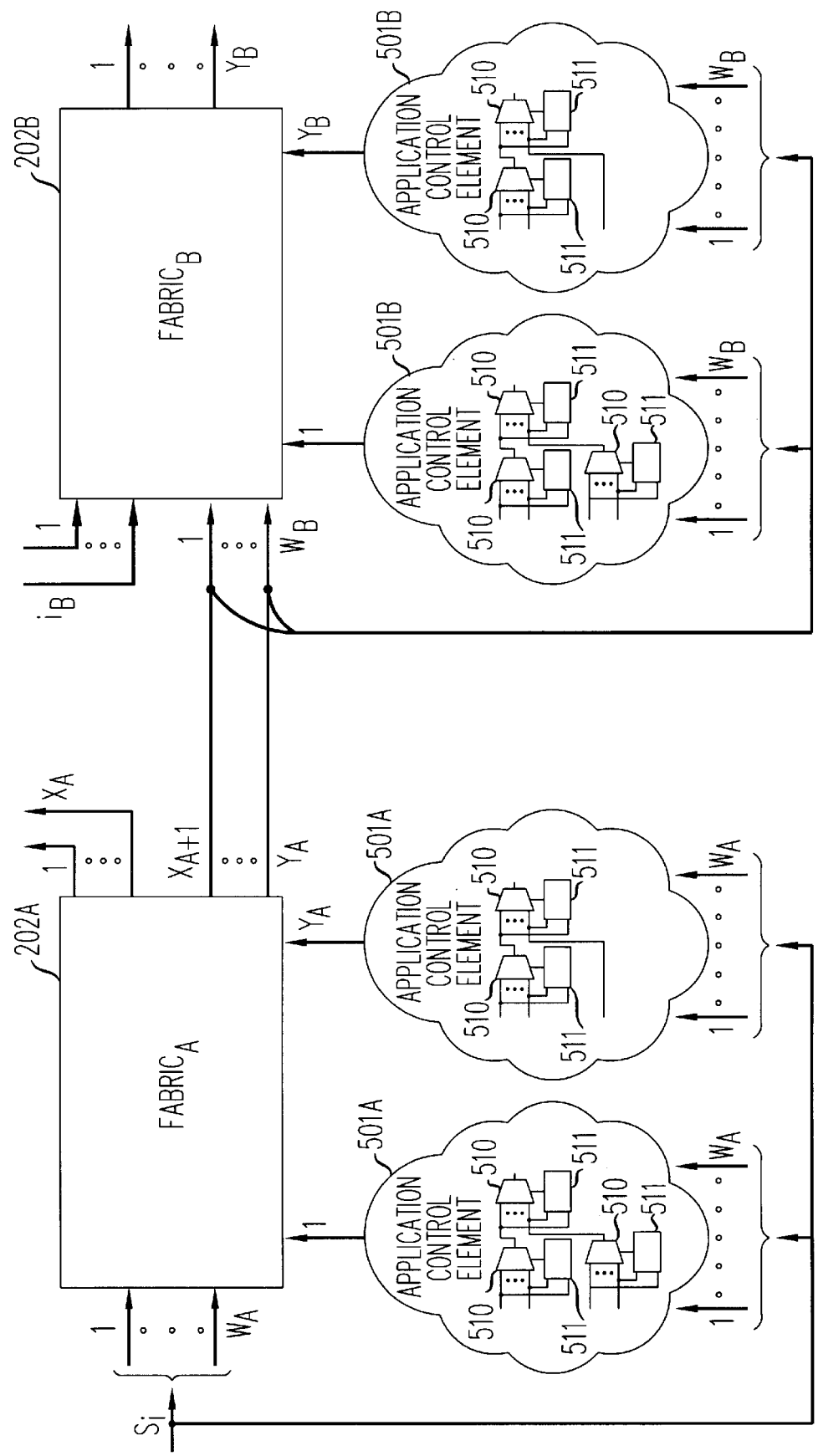
FIG. 7 shows in simplified form one implementation of a multi-stage fabric control arrangement embodying the principles of the present invention.

Although U.S. patent application Ser. No. 08/942,096, (Bordogna 4-7-8-2-3), incorporated herein by reference, describes a segmented control arrangement for a centralized switch fabric, the same principles can be applied, in conjunction with those of the present invention, to control distributed switch fabrics. More specifically, select logic element 435 from FIG. 4B may be comprised of multi-stage, application specific address resolution functions 501 as shown in FIG. 7. Each application specific address resolution function 501 includes control logic that can be selectively configured to resolve a single control input to switch fabric 202. More specifically, each application specific address resolution function 501 can include a number of logic stages selectively configured with an appropriate number and arrangement of selectors 510 and associated domain control functions 511.

For a segmented control application of distributed switch fabrics, switch fabric 202A receives a number of inputs $S_i$, represented as 1-$W_A$ inputs, and generates a number of outputs $S_o$, represented as 1-$Y_A$ outputs. Application specific address resolution functions 501A are coupled to switch fabric 202A with the number of application specific address resolution functions 501A being equal to the number of outputs $S_o$ so that each of the 1-$Y_A$ control inputs to switch fabric 202A is independently mapped to one of the 1-$Y_A$ outputs $S_o$. The address information and signal status information for each of the 1-$W_A$ inputs is provided as input to the application specific address resolution functions 501A. Application specific address resolution functions 501A are adapted to receive the address and signal status information from the 1-$W_A$ inputs and are further adapted to perform selection functions to generate a single control input based on the signal status information. Typically, the single control input provided to switch fabric 202A would include the address of the input signal that is to be selected by switch fabric 202A.

Because each application specific address resolution function 501A is independent from each other, each application specific address resolution function 501A can be configured to provide "resolved" control of a single output $S_o$. In effect, switch fabric 202A is "channelized" because of the one for one association between application specific address resolution functions 501A and 1-$Y_A$ outputs. As such, switch fabric 202A can simultaneously support 1-$Y_A$ separate applications in parallel on switch fabric 202A, because each "channel" of the switch fabric supports a separate application.

As shown, outputs SO may consist of a subset of real outputs, represented by outputs 1-$X_A$, as well as virtual outputs, represented as $X_{A+1}$-$Y_A$, which are transported to subsequent switching points such as switch fabric 202B. Switch fabric 202B can receive a mix of real and virtual inputs, the real inputs being inputs 1-$i_B$ and the virtual inputs being 1-$W_B$. It should be noted that virtual inputs 1-$W_B$ to switch fabric 202B correspond to the virtual outputs $X_{A+1}$-$Y_A$ from switch fabric 202A and, more importantly, these virtual inputs 1-$W_B$ include the encoded signal status along with the data. As such, the encoded signal status is provided as input to the application specific address resolution functions 501B in the same manner as previously described for switch fabric 202A and application specific address resolution functions 501A. Consequently, signal status information can be directly extracted locally at each switch fabric in order to facilitate selection decisions without having to trace and resolve signal status through previous switching points. All other aspects of controlling switch fabric 202B are also similar to that previously described for switch fabric 202A, such as application specific address resolution functions 501B corresponding on a one-to-one basis with the 1-$Y_B$ outputs from switch fabric 202B.

It should also be understood that the particular embodiments and applications described above are only illustrative of the principles of the invention. Those skilled in the art may devise other suitable implementations, without departing from the spirit and scope of the teachings herein, for a number of other applications which may or may not be fabric-based telecommunications applications. For example, the principles of the invention may be employed in a sensor-based system used in automobiles or for an alarm/surveillance system that uses sensors placed at peripheral points along a data path that extends through a facility. Status from the sensors could be combined with the signal and propagated as necessary for appropriate use by a central processing point, such as a control center. Additionally, the embedded signal status could be used for other than switching decisions. For example, the teachings of the invention may also be incorporated in fault isolation, identification and/or segmentation applications in which a multi-layer embedded signal status is used to manage faults in a multi-span, serial transmission path. In general, any application that could benefit from using multiple levels of embedded control would be able to apply the teachings of the invention described herein.

Additionally, the control architecture based on multi-layer embedded signal status according to the principles of the invention may be embodied in various hardware-based and software-based implementations, or combinations thereof. Accordingly, the scope of the present invention is limited only by the claims that follow.

What is claimed is:

1. A method of controlling the selection of signals by a plurality of network elements distributed along a transmission path, the method comprising the steps of:

deriving signal status information about a signal at any point along the transmission path;

encoding the signal status information corresponding to the signal in at least one of a plurality of signal status layers in the signal for transmission with the signal along the transmission path to each of the plurality of network elements, wherein the signal status information is indicative of one or more prescribed status conditions corresponding to the signal; and at any of the plurality of network elements, selectively extracting and decoding the encoded signal status information from at least one of the plurality of signal status layers to facilitate a selection decision for the corresponding signal, wherein the selection decision for a particular signal is made locally at a respective network element based on the encoded signal status information corresponding to the particular signal that is decoded at the respective network element.

2. The method of claim 1, wherein each of the plurality of network elements includes a corresponding control element, the control elements being substantially decoupled from each other, wherein the step of selectively extracting and decoding the encoded signal status information includes the steps of:

receiving the encoded signal status information as local input at each of the control elements; and supplying a control signal as a function of the encoded signal status information to any of the plurality of network elements from its corresponding control element.

3. The method of claim 1, wherein the step of encoding the signal status information includes the step of mapping status codes into any of the plurality of signal status layers, wherein each of the plurality of signal status layers is capable of carrying a plurality of status codes corresponding to prescribed signal status parameters.

4. The method of claim 1, wherein the step of encoding the signal status information includes the step of overwriting existing signal status information in at least one of the plurality of signal status layers with updated signal status information at a point along the transmission path.

5. The method of claim 1, wherein the step of encoding the signal status information includes the step of cumulatively adding the signal status information to different signal status layers as the signal propagates through successive points along the transmission path so that the signal is capable of retaining a cumulative signal status.

6. The method of claim 1, wherein the step of encoding the signal status information includes the step of encoding a different type of signal status information in each of the plurality of signal status layers to provide multiple levels of control for the selection decision.

7. The method of claim 2, wherein the plurality of network elements comprises a plurality of switch fabrics capable of protection switching in a SONET-based digital transmission network.

8. An apparatus for controlling the selection of signals in one of a plurality of network elements distributed along a transmission path, the apparatus comprising:
   means for deriving signal status information about a signal at any point along the transmission path;
   means for encoding the signal status information corresponding to the signal in at least one of a plurality of signal status layers in the signal for transmission with the signal along the transmission path to each of the plurality of network elements, wherein the signal status information is indicative of one or more prescribed status conditions corresponding to the signal; and
   means for selectively extracting and decoding the encoded signal status information from at least one of the plurality of signal status layers to facilitate a selection decision for the corresponding signal,
   wherein the selection decision for a particular signal is made locally at a respective network element based on the encoded signal status information corresponding to the particular signal that is decoded at the respective network element.

9. The apparatus of claim 8, wherein each of the plurality of network elements includes a corresponding control element, the control elements being substantially decoupled from each other, and wherein each control element is capable of receiving the encoded signal status information as local input and supplying a control signal as a function of the encoded signal status information to its corresponding network element.

10. The apparatus of claim 9, wherein the means for deriving and the means for encoding jointly define a signal interface portion, and wherein the signal interface portion is coupled to at least a second signal interface portion in a concatenated arrangement, the signal interface portions together being capable of cumulatively adding multiple layers of signal status to the signal.

11. The apparatus of claim 9, wherein the plurality of network elements comprise distributed switch fabrics.

12. The apparatus of claim 11, wherein the distributed switch fabrics support path-in-line protection switching in a SONET-based digital transmission network.

13. The apparatus of claim 8, wherein existing encoded signal status information in one of the plurality of signal status layers is capable of being overwritten with updated signal status information at a point along the transmission path.

14. The apparatus of claim 8, wherein the encoded signal status information is cumulatively added to different signal status layers as the signal propagates through successive points along the transmission path so that the signal is capable of retaining a cumulative signal status.

15. The apparatus of claim 8, wherein a different type of signal status information is encoded in each of the plurality of signal status layers to provide multiple levels of control for the selection decision.

16. The apparatus of claim 8, wherein the encoded signal status information comprises status codes, and wherein each of the plurality of signal status layers is capable of carrying a plurality of status codes corresponding to given signal status parameters.

17. An apparatus for controlling the selection of signals in one of a plurality of network elements distributed along a transmission path, the apparatus comprising:
   at least one signal monitoring element corresponding to a signal, the at least one signal monitoring element disposed along the transmission path for deriving signal status information about the signal;
   at least one status encoding element corresponding to the signal, the at least one status encoding element being operable to encode the signal status information corresponding to the signal in at least one of a plurality of signal status layers in the signal for transmission with the signal along the transmission path to each of the plurality of network elements, wherein the signal status information is indicative of one or more prescribed status conditions corresponding to the signal; and
   at least one status decoding element corresponding to the signal, the at least one status decoding element being operable to selectively extract and decode the encoded signal status information from at least one of the plurality of signal status layers to facilitate a selection decision for the corresponding signal,
   wherein the selection decision for a particular signal is made locally at a respective network element based on the encoded signal status information corresponding to the particular signal that is decoded at the respective network element.

18. The apparatus of clam 17, wherein the plurality of network elements comprises a plurality of switch fabrics capable of path-in-line protection switching in a SONET-based digital transmission network.

19. The apparatus of claim 18, wherein each of the plurality of switch fabrics includes a corresponding control element, the control elements being substantially decoupled from each other, and wherein each control element is capable of receiving the encoded signal status information as local input and supplying a control signal as a function of the encoded signal status information to its corresponding switch fabric.

20. The apparatus of claim 19, wherein the at least one signal monitoring element and the at least one status encoding element jointly define a signal interface portion, and wherein the signal interface portion is coupled to at least a second signal interface portion in a concatenated arrangement, the signal interface portions together being capable of cumulatively adding multiple layers of signal status to the signal.

21. An apparatus for controlling the selection of signals for protection switching at any of a plurality of network elements comprising switch fabrics distributed along a transmission path, the apparatus comprising:
   at least one signal monitoring element corresponding to a signal, the at least one signal monitoring element disposed along the transmission path for deriving signal status information about the signal;

at least one status encoding element corresponding to the signal, the at least one status encoding element being operable to encode the signal status information corresponding to the signal in at least one of a plurality of signal status layers in the signal so that the signal status information propagates with the signal along the transmission path to each of the plurality of network elements, wherein the signal status information is indicative of one or more prescribed status conditions corresponding to the signal; and at least one status decoding element corresponding to the signal, the at least one status decoding element being operable to selectively extract and decode the encoded signal status information from at least one of the plurality of signal status layers to facilitate a protection switching decision for the corresponding signal, wherein the protection switching decision for a particular signal is made locally at a respective network element based on the encoded signal status information corresponding to the particular signal that is decoded at the respective network element.

22. A method of controlling multiple switching operations in a network including a plurality of switching elements distributed along a transmission path, the method comprising:

deriving status information about a signal at any point along the transmission path, wherein the status information is indicative of one or more prescribed status conditions corresponding to the signal;

encoding the status information corresponding to the signal in at least one of a plurality of signal status layers in the signal for transmission with the signal along the transmission path to each of the plurality of switching elements; and at any of the plurality of switching elements, selectively extracting and decoding the encoded status information from at least one of the plurality of signal status layers to facilitate a switching decision for the corresponding signal, wherein the switching decision for a particular signal is made locally at a respective switching element based on the encoded status information corresponding to the particular signal that is decoded at the respective switching element.

23. A method for controlling signal routing in network elements distributed along a transmission path, the method comprising:

deriving status information about a signal at any point along the transmission path, wherein the status information is indicative of one or more prescribed status conditions corresponding to the signal;

encoding the status information corresponding to the signal in at least one of a plurality of signal status layers in the signal for transmission with the signal along the transmission path to each of the plurality of network elements; and transmitting the signal and the status information corresponding to the signal via the transmission path, such that routing decisions for the signal can be made locally at a network element based on the encoded status information corresponding to the signal.

24. A method for controlling signal routing in network elements distributed along a transmission path, the method comprising:

at a network element, receiving a signal along with status information corresponding to the signal, wherein the status information is encoded in a plurality of signal status layers in the signal and transmitted with the signal and wherein the status information is indicative of one or more prescribed status conditions corresponding to the signal; and selectively extracting and decoding the encoded status information from at least one of the plurality of signal status layers to facilitate a routing decision for the corresponding signal locally at the network element.

* * * * *